US009600735B2

(12) United States Patent
Nakagome et al.

(10) Patent No.: US 9,600,735 B2
(45) Date of Patent: Mar. 21, 2017

(54) IMAGE PROCESSING DEVICE, IMAGE PROCESSING METHOD, PROGRAM RECORDING MEDIUM

(71) Applicant: CASIO COMPUTER CO., LTD., Tokyo (JP)

(72) Inventors: Kouichi Nakagome, Tokorozawa (JP); Shigeru Kafuku, Akishima (JP)

(73) Assignee: CASIO COMPUTER CO., LTD. (JP)

(*) Notice: Subject to any disclaimer, the term of this patent is extended or adjusted under 35 U.S.C. 154(b) by 4 days.

(21) Appl. No.: 14/658,696

(22) Filed: Mar. 16, 2015

(65) Prior Publication Data
US 2015/0269423 A1 Sep. 24, 2015

(30) Foreign Application Priority Data

Mar. 20, 2014 (JP) .................. 2014-057724

(51) Int. Cl.
G06K 9/00 (2006.01)
G06K 9/38 (2006.01)
G06T 7/00 (2006.01)
G06T 11/00 (2006.01)

(52) U.S. Cl.
CPC .............. G06K 9/38 (2013.01); G06T 7/0042 (2013.01); G06T 7/0085 (2013.01); G06T 11/001 (2013.01); G06T 2207/30201 (2013.01)

(58) Field of Classification Search
CPC ............ G06K 9/00248; G06K 9/00302; G06T 7/0042; G06T 2207/10004; G06T 2207/30201
See application file for complete search history.

(56) References Cited

U.S. PATENT DOCUMENTS

| 2003/0095701 A1* | 5/2003 | Shum ................. G06K 9/00221 382/155 |
| 2003/0206171 A1* | 11/2003 | Kim ........................ G06T 11/00 345/473 |
| 2009/0087099 A1* | 4/2009 | Nakamura ......... G06K 9/00281 382/190 |
| 2010/0079491 A1* | 4/2010 | Nonaka ................... G06T 11/00 345/630 |

FOREIGN PATENT DOCUMENTS

| JP | 2003-085576 A | 3/2003 |
| JP | 2004-145625 A | 5/2004 |

* cited by examiner

Primary Examiner — Kim Vu
Assistant Examiner — Michael Vanchy, Jr.
(74) Attorney, Agent, or Firm — Fitch Even Tabin & Flannery LLP

(57) ABSTRACT

An image processing device is provided with an acquiring unit configured to acquire a face image and, a control unit configured to specify a face direction in the face image acquired by the acquiring unit and add, based on the specified face direction, a picture expressing a contour of a face component to the face image.

13 Claims, 5 Drawing Sheets

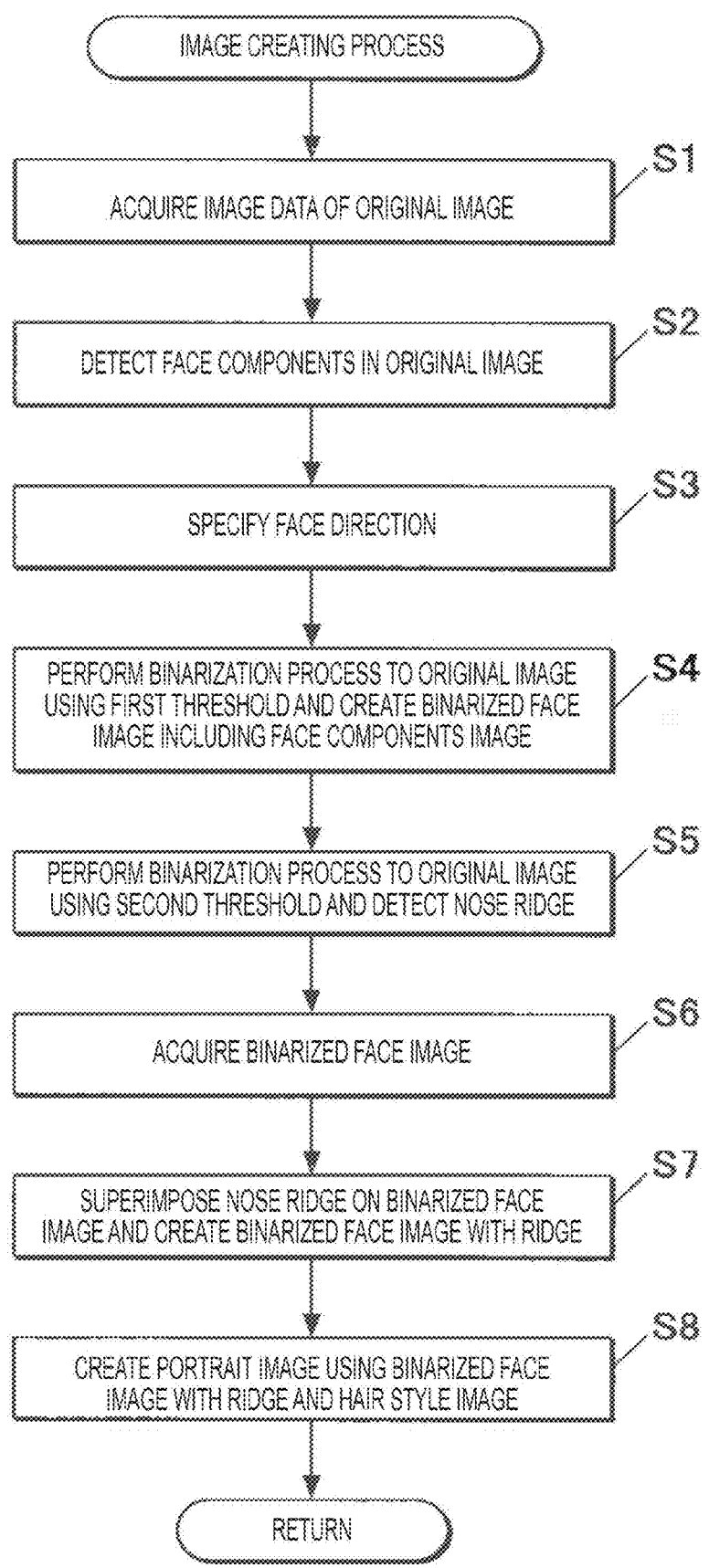

IMAGE PROCESSING DEVICE, IMAGE PROCESSING METHOD, PROGRAM RECORDING MEDIUM

CROSS-REFERENCE TO RELATED APPLICATIONS

This application is based upon and claims the benefit of priority from the prior Japanese Patent Application No. 2014-057724, filed Mar. 20, 2014, and the entire contents of which are incorporated herein by reference.

BACKGROUND OF THE INVENTION

Field of the Invention

The present invention relates to an image processing device, an image processing method, and a program recording medium.

Description of the Related Art

Conventionally, there is known a portrait creation device which creates a portrait by using feature points of face parts, such as eyes, a nose, a mouth, ears, and a facial contour (for example, JP 2004-145625 A).

SUMMARY OF THE INVENTION

There is also known another technique to create a portrait image from a photographic image by using a binarization process. However, when a portrait image is created based on an image in which a face is rotated, a sense of incongruity is caused unless lines expressing shades according to the rotation direction of the face are drawn. As a result, it is likely to degrade the expressiveness of the portrait image.

A purpose of the present invention is to provide an image processing device, an image processing method, and a program, which can improve the expressiveness of a face image.

To achieve the purpose described above, an image processing device according to an embodiment of the invention includes:

an acquiring unit configured to acquire a face image; and a control unit configured to specify a face direction in the face image acquired by the acquiring unit and add, based on the specified face direction, a picture expressing a contour of a face component to the face image.

An image processing method according to an embodiment of the present invention is an image processing method using the image processing device which includes a control unit, the method including the steps of:

acquiring, by the control unit, a face image;

specifying, by the control unit, a face direction in the acquired face image; and adding, by the control unit, a picture expressing a contour of a face component to the face image based on the specified face direction.

A non-transitory computer-readable recording medium according to an embodiment of the present invention stores a program for processing an image and causing a computer to execute:

acquiring, as an acquiring unit, a face image;

specifying, as a specifying unit, a face direction in the acquired face image; and adding, as an adding unit, based on the specified face direction, a picture expressing a contour of a face component to the face image.

BRIEF DESCRIPTION OF DRAWINGS

FIG. 2 is a flowchart showing an exemplary operation according to an image creating process by the image capturing device of FIG. 1;

DETAILED DESCRIPTION

Specific aspects of the invention will be described below with reference to the drawings. However, the scope of the invention is not limited to the illustrated examples.

Figure 1:
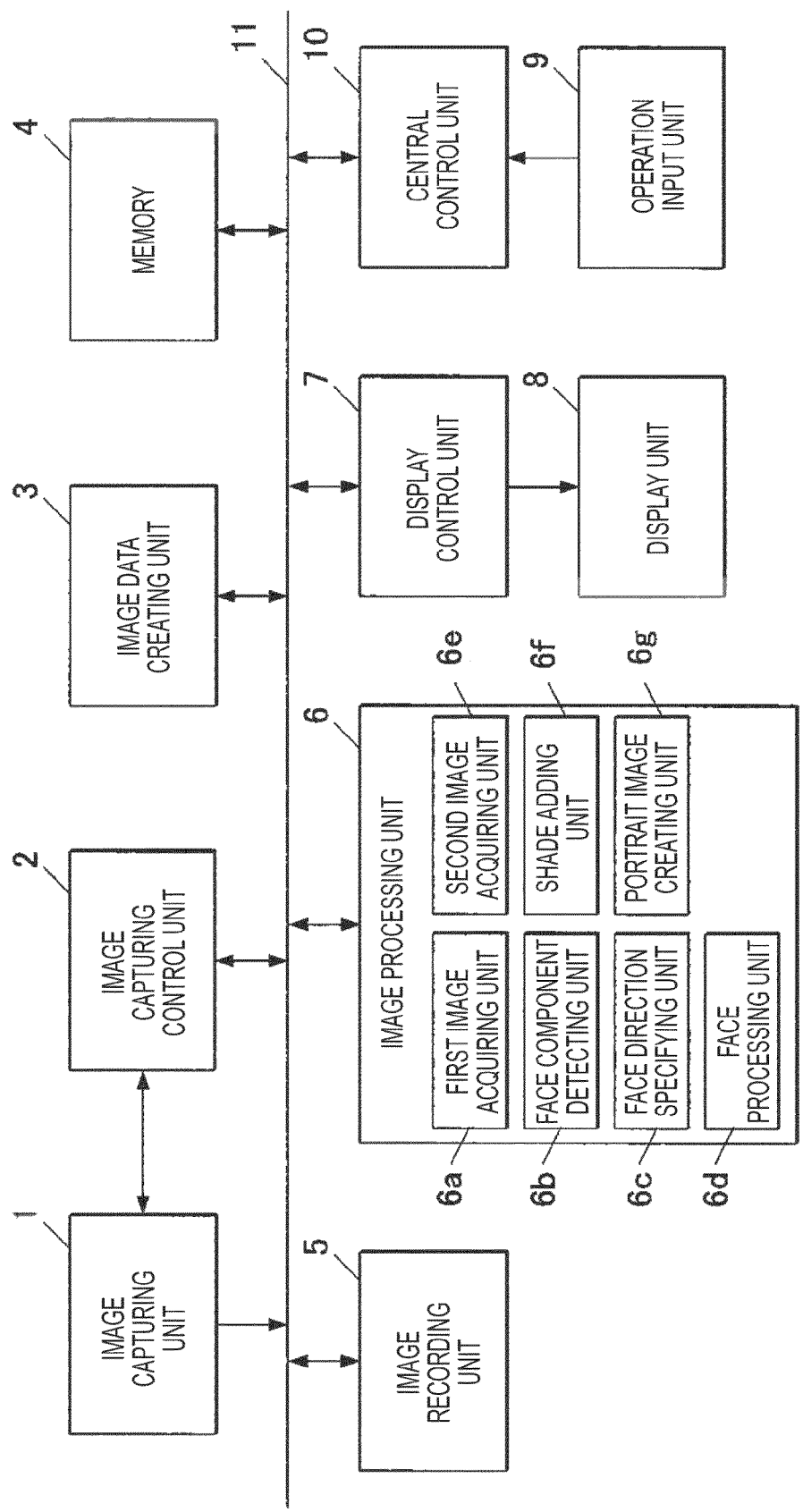
FIG. 1 is a block diagram showing a schematic configuration of an image capturing device according to an embodiment of the present invention.

FIG. 1 is a block diagram showing a schematic configuration of an image capturing device 100 according to an embodiment of the invention.

Specifically, as shown in FIG. 1, the image capturing device 100 according to the embodiment includes an image capturing unit 1, an image capturing control unit 2, an image data creating unit 3, a memory 4, an image recording unit 5, an image processing unit 6, a display control unit 7, a display unit 8, an operation input unit 9, and a central control unit 10.

Moreover, the image capturing unit 1, the image capturing control unit 2, the image data creating unit 3, the memory 4, the image recording unit 5, the image processing unit 6, the display control unit 7, and the central control unit 10 are connected to each other through a bus line 11.

Known devices can be applied to the image capturing device 100. The known devices include not only a digital camera which has an image capturing function as a major function as described in the embodiment, but also portable terminals, such as a mobile phone or a smart phone, which have an image capturing function as an auxiliary function.

The image capturing unit 1, as an image capturing unit, creates a frame image by capturing an image of a predetermined object.

Specifically, the image capturing unit 1 includes, although not shown, for example, a lens unit (e.g., a zoom lens and a focus lens), an electronic image capturing unit (e.g., a charge coupled device (CCD) and a complementary metal-oxide semiconductor (CMOS)), and a lens driving unit which moves the zoom lens and the focus lens in the optical axis direction.

The image capturing control unit 2 controls capturing the image of the object by the image capturing unit 1.

Specifically, the image capturing control unit 2 includes, although not shown, for example a timing generator and a driver. The image capturing control unit 2 scans and drives the electronic image capturing unit by the timing generator and the driver. Then, the image capturing control unit 2 converts, by the electronic image capturing unit, an optical image having passed through the lens unit into a two-dimensional image signal at every predetermined cycle. Thereafter, the image capturing control unit 2 reads one screen portion of the frame images at a time from an image capturing region of the electronic image capturing unit and outputs the frame images to the image data creating unit 3.

Moreover, the image capturing control unit 2 may adjust and control the conditions for capturing images of the object, such as an automatic focusing process (AF), an automatic exposure process (AE), and an automatic white balance (AWB).

The image data creating unit 3 appropriately performs gain adjustment, for each of the color components of the RGB, to an analog value signal of the frame image transferred from the electronic image capturing unit of the image capturing unit 1. Thereafter, the image data creating unit 3 samples and holds the signal by a sample/hold circuit (not shown), and converts the signal to digital data by an A/D converter (not shown). Then, after performing color process treatment including a pixel interpolation process and a γ-correction process by a color processing circuit (not shown), the image data creating unit 3 creates a digital value luminance signal Y and color difference signals Cb and Cr (YUV data).

The digital value luminance signal Y and the color difference signals Cb and Cr which are output from the color processing circuit are DMA-transferred through a direct memory access (DMA) controller (not shown) to the memory 4 used as a buffer memory.

The memory 4 includes, for example, a dynamic random access memory (DRAM) and temporarily stores the data to be processed by, for example, the image processing unit 6 and the central control unit 10.

The image recording unit 5 includes, for example, a non-volatile memory (a flash memory) and records the image data to be recorded. The image data is encoded in accordance with a predetermined compression format (e.g., JPEG format) by an encoding unit (not shown) of the image processing unit 6.

The image recording unit 5 may detachably include, for example, a recording medium (not shown) and may also be configured to control reading/writing data from/to the attached recording medium.

The image processing unit 6 includes a first image acquiring unit 6a, a face component detecting unit 6b, a face direction specifying unit 6c, a face processing unit 6d, a second image acquiring unit 6e, a shade adding unit 6f, and a portrait image creating unit 6g.

Each unit of the image processing unit 6 includes, for example, a predetermined logic circuit. However, the configuration has been described as an example and is not limited to the example.

The first image acquiring unit 6a acquires an original image P1 to be processed in an image creating process.

In other words, the first image acquiring unit (first acquiring unit) 6a acquires image data of the original image (face image) P1. Specifically, the first image acquiring unit 6a acquires a duplication of the image data (RGB data or YUV data) of the original image P1 (e.g., a photographic image) from the memory 4 and also acquires a duplication of the image data of the original image P1 recorded in the image recording unit 5 (see FIG. 3A). The original image P1 is created by the image data creating unit 3 by capturing the image of the object by the image capturing unit 1 and the image capturing control unit 2.

Moreover, each process, which will be described later, by the image processing unit 6 may be performed to the image data of the original image P1 or to reduced image data in a predetermined size (e.g., VGA size) to which the image data of the original image P1 is reduced at a predetermined ratio as necessary.

The face component detecting unit 6b detects main face components of the face in the original image P1.

In other words, the face components detecting unit (detecting unit) 6b detects the face components, such as eyes, a nose, a mouth, eyebrows, and a facial contour, in the original image P1 acquired by the first image acquiring unit 6a. Specifically, the face component detecting unit 6b detects eyes, a nose, a mouth, eyebrows, and a facial contour in the original image P1 by a process using, for example, an active appearance model (AAM).

The AAM is a method for modeling a visual matter, and a process for modeling an image of an arbitrary face region. For example, the face component detecting unit 6b registers, in a predetermined registering unit, positions of predetermined feature parts (e.g., corners of eyes, tips of noses, and face lines) of sample face images, and statistical analysis results of pixel values (e.g., luminance values). Then, the face component detecting unit 6b sets, based on the positions of the feature parts, a shape model of a face shape and a texture model which expresses "appearance" in an average shape, and performs modeling of the image of the face region using these models. In this manner, the face components, such as eyes, a nose, a mouth, eyebrows, and a facial contour, in the original image P1 are modeled.

The process using AAM has been described as an example of detecting the face components. However, the process is not limited to the example and can be arbitrarily changed to an appropriate process, such as an edge extraction process, an anisotropic diffusion process, or a template matching.

The face direction specifying unit 6c specifies a face direction.

In other words, the face direction specifying unit (specifying unit) 6c specifies the face direction in the original image P1 acquired by the first image acquiring unit 6a. Specifically, the face direction specifying unit 6c specifies the right-left direction of the face where the axis is the straight line connecting the top of the head and the tip of the jaw in the original image P1. For example, the face direction specifying unit 6c estimates the visual line direction of the eyes based on the result of the process using AAM by the face component detecting unit 6b and specifies the right-left direction of the face according to the estimated visual line direction.

The method based on the result of the process using AAM by the face component detecting unit 6b has been described as an example of specifying the face direction. However, the method is not limited to the example and can be arbitrarily changed to an appropriate method which can specify the face direction. The above-described process of estimating the visual line direction is a known technique and the detailed description thereof is omitted.

The face processing unit 6d performs various processes to the original image P1.

In other words, the face processing unit 6d performs a binarization process to the original image P1 and creates a binarized image. Specifically, after performing a smoothing process and a blurring process to the original image (e.g., a photographic image) P1, the face processing unit 6d performs the binarization process using a first threshold and creates the binarized image. Moreover, the face processing unit 6d detects a face region from the binarized image by, for example, a predetermined face detecting process. Thereafter, the face processing unit 6d performs a detail extracting process on the face region using the detection results of the face components by the face component detecting unit 6b, and creates a face detail image (not shown) in which the face components, such as eyes, a nose, a mouth, eyebrows, hair, and a facial contour, are expressed with lines. Furthermore, the face processing unit 6d creates a binarized face image (processed face image) P2 in which the face components, including face component images A, such as eyes, a nose, a mouth, and eyebrows, inside and adjacent to the facial contour of the face detail image are expressed with lines (see FIG. 3B).

The above-described smoothing process, blurring process, binarization process, and face detecting process are known techniques, and the detailed description thereof is omitted.

The face processing unit 6d detects a nose ridge L from the face in the original image P1.

In other words, the face processing unit (detecting unit) 6d detects the nose ridge L from the original image P1 acquired by the first image acquiring unit 6a based on the right-left direction of the face specified by the face direction specifying unit 6c. Specifically, the face processing unit 6d performs a binarization process to the original image P1 using a second threshold and detects the nose ridge L (see FIG. 4A).

For example, the face processing unit 6d sets, to the threshold (the second threshold), a different value (for example, a smaller value) from that used for detecting the face components and detects the nose ridge L by performing, to the original image P1, the binarization process using the second threshold. The second threshold may be changeable, for example, within the range including a different value from that used for detecting the face components. Moreover, the second threshold may be set by taking into consideration, for example, the brightness and the contrast of the original image P1.

Furthermore, when the face direction specifying unit 6c specifies that the face direction is the left with respect to the face, the face processing unit 6d sets a detection range to easily detect the nose ridge L from the left region based on the nose position of the face. On the other hand, when the face direction specifying unit 6c specifies that the face direction is the right with respect to the face, the face processing unit 6d sets a detection range to easily detect the nose ridge L from the right region based on the nose position of the face. Then, the face processing unit 6d performs, to the pixels within the set detection range, the binarization process using the second threshold set to a different value from that used for detecting the face components. Thereafter, the face processing unit 6d detects the x-y coordinates of the pixels which constitute the nose ridge L and creates position data.

The method using the binarization process has been described as an example of detecting the nose ridge L. However, the method is not limited to the example and can be arbitrarily changed to an appropriate method which can detect the nose ridge L.

The second image acquiring unit 6e acquires the binarized face image P2.

In other words, the second image acquiring unit (second acquiring unit) 6e acquires the binarized face image (processed face image) P2 created by performing, to the original image P1, the binarization process using the predetermined threshold. Specifically, the second image acquiring unit 6e acquires the image data of the binarized face image P2 created by, for example, the face processing unit 6d.

The shade adding unit 6f adds the nose ridge L to the binarized face image P2.

In other words, the shade adding unit (adding unit) 6f adds lines expressing shades (e.g., the nose ridge L) to the binarized face image (processed face image) P2 acquired by the second image acquiring unit 6e based on the face direction specified by the face direction specifying unit 6c. Specifically, the shade adding unit 6f adds the nose ridge L detected by the face processing unit 6d to the binarized face image P2 acquired by the second image acquiring unit 6e. For example, the shade adding unit 6f specifies the position to superimpose the nose ridge L inside the binarized face image P2 (especially, inside the facial contour) based on the position data of the pixels which constitute the nose ridge L. Then, the shade adding unit 6f creates the image data of a binarized face image with ridge P3 obtained by superimposing the nose ridge L on the specified position (see FIG. 4A).

The portrait image creating unit 6g creates a portrait image P4 which schematically expresses the face.

In other words, the portrait image creating unit (creating unit) 6g creates the portrait image P4 which schematically expresses the face by using the binarized face image (processed face image) P2 to which the lines expressing the shades (e.g., the nose ridge L) are added by the shade adding unit 6f. Specifically, the portrait image creating unit 6g acquires the image data of the binarized face image with ridge P3 on which the nose ridge L is superimposed by the shade adding unit 6f and also acquires the image data of a predetermined hair style image corresponding to the facial contour detected by the face component detecting unit 6b. Then, the portrait image creating unit 6g specifies the positions to superimpose the face component images A and the nose ridge L of the binarized face image with ridge P3 inside the facial contour of the acquired predetermined hair style image. Thereafter, the portrait image creating unit 6g creates the image data of the portrait image P4 which schematically expresses the original image P1 with a portrait by superimposing the face component images A and the nose ridge L on the specified positions (see FIG. 4B).

The portrait image creating unit 6g may create the portrait image P4 in which predetermined parts (for example, the face components, such as eyes, a mouth and eyebrows) are expressed with predetermined colors.

The display control unit 7 controls reading the image data to be displayed which are temporarily stored in the memory 4 and displaying the image data on the display unit 8.

Specifically, the display control unit 7 includes, for example, a video random access memory (VRAM), a VRAM controller, and a digital video encoder. The digital video encoder periodically reads, from the VRAM, the luminance signal Y and the color difference signals Cb and Cr, which have been read from the memory 4 and stored in the VRAM (not shown), through the VRAM controller under the control of the central control unit 10. Then, the digital video encoder generates video signals based on these data and outputs the video signals to the display unit 8.

The display unit 8 is, for example, a crystal liquid display panel and displays, on the display screen, the images captured by the image capturing unit 1 based on the video signals from the display control unit 7. Specifically, in a still image capturing mode or a moving image capturing mode, the display unit 8 displays a live-view image while sequentially updating, at a predetermined frame rate, the frame images created by capturing the image of the object by the image capturing unit 1 and the image capturing control unit 2. Moreover, the display unit 8 displays images to be recorded as the still images (rec view image) and displays images being recorded as the moving images.

The operation input unit 9 is for performing predetermined operations of the image capturing device 100. Specifically, the operation input unit 9 includes operation units, such as a shutter button related to capturing instructions of the object, a selection deciding button related to selection instructions of image capturing modes, functions, and the like, and a zoom button related to adjustment instructions of zooming (which are not shown). The operation input unit 9 outputs, to the central control unit 10, predetermined operation signals according to the operation of the buttons of the operational unit.

The central control unit 10 controls each unit of the image capturing device 100. Specifically, the central control unit 10 includes, although not shown, a central processing unit (CPU) and the like, and performs various controlling operations according to various processing programs (not shown) for the image capturing device 100.

<Image Creating Process>

Next, an image creating process by the image capturing device 100 will be described with reference to FIGS. 2 to 4B.

FIG. 2 is a flowchart showing an exemplary operation according to the image creating process.

The image creating process is performed by each unit of the image capturing device 100, especially by the image processing unit 6 under the control of the central control unit 10, when an image processing mode is selected and instructed, by a user, from a plurality of operation modes displayed on a menu screen based on a predetermined operation of the selection deciding button of the operation input unit 9.

Moreover, it is assumed that the image data of the original image P1 to be processed in the image creating process is recorded in the image recording unit 5 in advance.

Figure 3A:
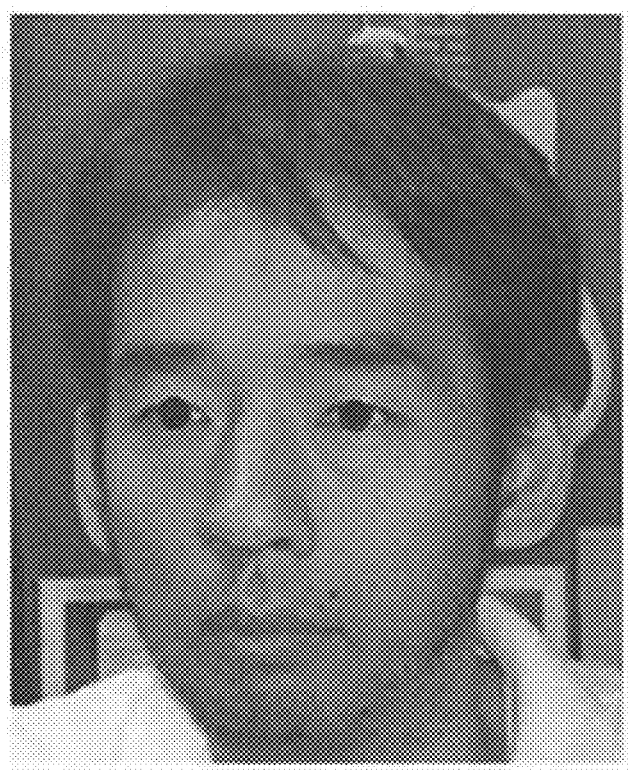
FIGS. 3A and 3B are diagrams to illustrate the image creating process of FIG. 2.

As shown in FIG. 2, first, the first image acquiring unit 6a reads, from the image recording unit 5, the image data designated, by a user, to be processed in the image creating process among the image data of a plurality of the original images P1 recorded in the image recording unit 5 based on the predetermined operation of the operation input unit 9 and acquires the designated data (step S1; see FIG. 3A).

Next, the face component detecting unit 6b performs the predetermined detecting process (e.g., AAM) to the image data of the original image P1 acquired by the first image acquiring unit 6a and detects the face components, such as eyes, a nose, a mouth, eyebrows, and a facial contour (step S2).

Then, the face direction specifying unit 6c estimates the visual line direction of the eyes based on the results of the process using AAM by the face component detecting unit 6b and specifies the right-left direction of the face according to the estimated visual line direction (step S3).

Figure 3B:
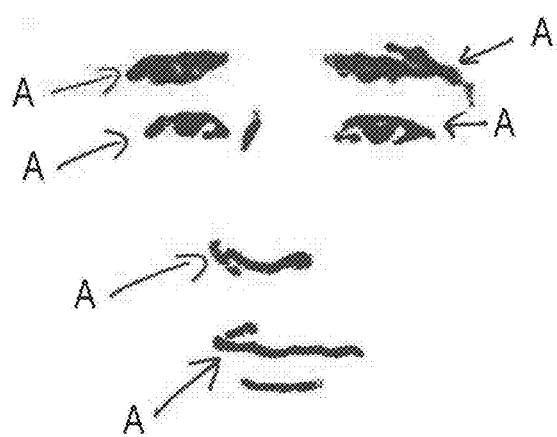

Next, after the face processing unit 6d performs the smoothing process, the blurring process and the like to the image data of the original image P1 acquired by the first image acquiring unit 6a, the face processing unit 6d performs the binarization process using the first threshold and creates the binarized face image P2 including the face component images A, such as eyes, a nose, a mouth, and eyebrows (step S4; see FIG. 3B).

Then, the face processing unit 6d performs the binarization process to the original image P1 using the second threshold based on the right-left direction of the face specified by the face direction specifying unit 6c, and detects the nose ridge L (step S5).

Next, the second image acquiring unit 6e acquires the image data of the binarized face image P2 created by the face processing unit 6d (step S6).

Figure 4A:
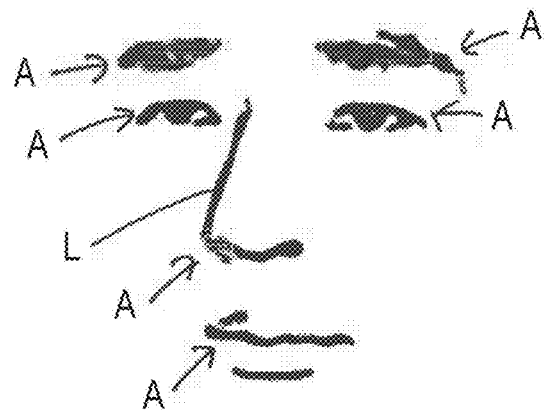
FIGS. 4A and 4B are diagrams to illustrate the image creating process of FIG. 2.

Then, the shade adding unit 6f specifies the position to superimpose the nose ridge L detected by the face processing unit 6d inside the binarized face image P2 (especially, inside the facial contour) acquired by the second image acquiring unit 6e based on the position data of the pixels which constitute the nose ridge L and creates the image data of the binarized face image with ridge P3 by superimposing the nose ridge L on the specified position (step S7; see FIG. 4A).

Figure 4B:
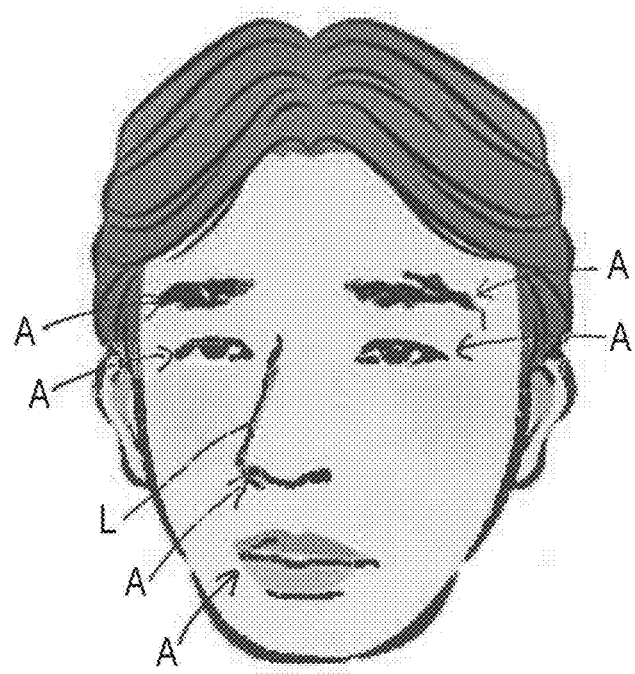

Next, the portrait image creating unit 6g acquires the image data of the binarized face image with ridge P3 on which the nose ridge L is superimposed by the shade adding unit 6f, also acquires the image data of the predetermined hair style image, superimposes the face component images A and the nose ridge L of the binarized face image with ridge P3 inside the facial contour of the predetermined hair style image, and creates the image data of the portrait image P4 which schematically expresses the original image P1 with the portrait (step S8; see FIG. 4B). Thereafter, the image recording unit 5 acquires and records the image data of the portrait image P4.

In this manner, the image creating process ends.

As described above, the image capturing device 100 according to the embodiments can specify the face direction in the face image. Then, by performing the binarization process to the face image based on the specified face direction, the image capturing device 100 can add lines expressing the shades on the created binarized face image (processed face image) P2. Accordingly, when creating the portrait image P4 based on the face image in which the face direction is not the front but rotated, the image capturing device 100 can express the shades according to the rotation direction of the face. Specifically, the image capturing device 100 can appropriately express the shades according to the right-left rotation direction of the face by adding the nose ridge L to the binarized face image P2 based on the right-left direction of the face where the axis is the straight line connecting the top of the head and the tip of the jaw, and can express the contour of the face component. In this manner, the image capturing device 100 can add a picture expressing the contour of the face component to the face image with a different brightness (color) from that of the periphery of the contour to the point of the face image where the contour of the face component cannot be recognized since the brightness of the contour is the same as that of the periphery of the contour. Similarly, when a nose cannot be recognized since a color of the nose is the same skin color as that of a cheek around the nose, the image capturing device 100 according to the embodiment can add the nose contour (ridge) to the face image with a different color from the skin color in order to recognize the nose.

Therefore, the expressiveness of the face image can be improved.

Moreover, the nose ridge L can be appropriately detected from the face image based on the right-left direction of the face. Furthermore, the nose ridge L can be more appropriately detected by the binarization process. The binarization process is performed, to the face image, using the predetermined threshold (especially, the second threshold which is different from the first threshold used for creating the binarized face image P2).

The portrait image P4 which schematically expresses the face is created by using the binarized face image with ridge P3 (processed face image) to which the lines expressing the shades are added. In other words, by using the binarized face image P2 in which the shades are expressed based on the rotation direction of the face, the portrait image P4 can be appropriately created more naturally with high completeness.

The present invention is not limited to the above-described embodiment, and various improvements and design changes can be made without departing from the scope of the invention.

Figure 5:
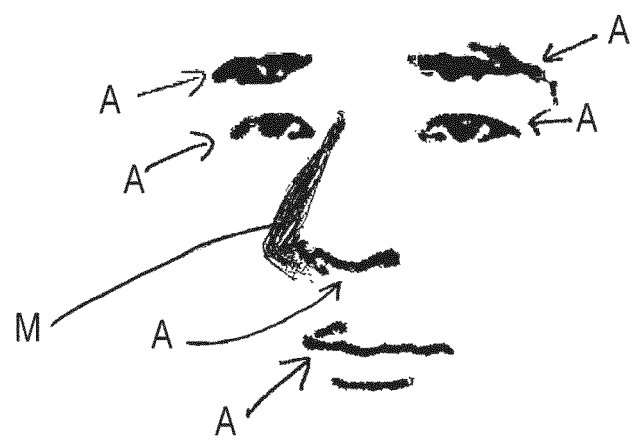
FIG. 5 is a diagram to illustrate an example of the image created by the image creating process of the present invention.

For example, in the above-described embodiment, the nose ridge L has been described as an example of the lines expressing the shades. However, the method expressing the shades is not limited to the example, and can be arbitrarily changed. For example, a color and a shape expressing the shades as a shadow picture M of a face image P5 shown in FIG. 5 and a picture can be added in order to express the shades. In this manner, the nose ridge can be expressed by expressing the shades based on the face direction. Furthermore, the nose ridge L has been described as an example of the face component to be detected and added to the binarized face image P2. However, the face component to be detected and added to the binarized face image P2 is not limited to the example and whether the face processing unit 6d as a detecting unit to detect the nose ridge L is provided or not can be arbitrarily changed.

The right-left direction of the face has been described as an example of the face direction when the axis is the straight line connecting the top of the head and the tip of the jaw. However, the face direction is not limited to the example and may be, for example, an up-down direction when the axis is the straight line substantially orthogonal to the straight line connecting the top of the head and the tip of the jaw in the face image, or an oblique direction obtained by combining these right-left direction and up-down direction.

Furthermore, in the above-described embodiment, the portrait image P4 is created by using the binarized face image with ridge P3 to which the lines expressing the shades are added. However, the portrait image P4 is not necessarily created and whether the portrait image creating unit 6g is provided or not can be arbitrarily changed.

Moreover, in the above-described embodiment, the binarized face image P2 is created by performing the binarization process to the original image P1. However, the binarized face image P2 is not necessarily created in the main body of the device and whether the face processing unit 6d is provided or not can be arbitrarily changed. For example, the binarized face image P2 created by an external device may be acquired.

Furthermore, the configuration of the image capturing device 100 has been described as an example and is not limited to the example. The image capturing device 100 has been described as an example of the image processing device. However, the image processing device is not limited to the example and any configuration capable of executing the image process according to an embodiment of the invention may be used.

In the above-described embodiment, after specifying the face direction, the binarization process is performed to the face image, and then the lines expressing the shades are added to the face image created by performing the binarization process. However, the processing order of adding the lines expressing the shades is not limited to the example.

In addition, in the above-described embodiment, the functions of the first acquiring unit, the specifying unit, the second acquiring unit, and the adding unit are implemented by driving, respectively, the first image acquiring unit 6a, the face direction specifying unit 6c, the second image acquiring unit 6e, and the shade adding unit 6f under the control of the CPU of the central control unit 10. However, the configurations are not limited to these examples and may be implemented by, for example, executing a predetermined program by the CPU of the central control unit 10.

In other words, the programs including a first acquiring processing routine, a specifying processing routine, a second acquiring processing routine, and an adding processing routine are stored in a program memory (not shown) storing programs. Then, the CPU of the central control unit 10 may function, by the first acquiring processing routine, as a unit configured to acquire the face image. Furthermore, the CPU of the central control unit 10 may function, by the specifying processing routine, as a unit configured to specify the face direction in the acquired face image. The CPU of the central control unit 10 may function, by the second acquiring processing routine, as a unit configured to acquire the processed face image created by performing the binarization process to the face image. The CPU of the central control unit 10 may function, by the adding processing routine, as a unit configured to add, based on the specified face direction, the lines expressing the shades to the acquired processed face image.

Similarly, the detecting unit and the creating unit may be implemented by executing a predetermined program by the CPU of the central control unit 10

The control unit may have a configuration or a plurality of configurations.

Furthermore, as a non-transitory computer-readable recording medium storing a program to execute the above-described processes, a non-volatile memory such as a flash memory, and a portable recording medium such as a CD-ROM, other than a ROM and a hard disk can be applied. As a medium for providing the program data through a predetermined communication channel, a carrier wave may be applied.

The embodiments according to the invention have been described above. However, the scope of the invention is not limited to the above-described embodiments and includes the scope described in the claims and equivalents thereof.

What is claimed is:

1. An image processing device comprising:
a processor to:
acquire a face image;
create a converted face image by performing a first binarization process to the face image using a first threshold value;
specify a face direction from a visual line direction of eyes in the acquired face image;
detect a nose ridge in an area determined based on the specified face direction by performing a second binarization process using a second threshold value lower than the first threshold value, when the specified face direction is one of a left side direction and a right side direction; and
add the detected nose ridge to the converted face image.

2. The image processing device according to claim 1, wherein
the processor specifies a right-left direction of the face where an axis is a straight line connecting a top of a head and a tip of a jaw in the acquired face image.

3. The image processing device according to claim 1, wherein
the processor creates a portrait image schematically expressing the face by using the converted face image to which the nose ridge is added.

4. The image processing device according to claim 1, wherein the processor adds the nose ridge to the face image with a different brightness from that of a periphery of the contour to a point of the face image where the nose ridge is not able to be recognized since the brightness of the contour is the same as that of the periphery of the contour.

5. The image processing device according to claim 1, wherein the processor detects face components except for the nose ridge by the first binarization process using the first threshold and detects the nose ridge by second binarization process using the second threshold.

6. The image processing device according to claim 1, wherein the processor sets the area determined (i) for a left region based on a nose position of the face when the specified face direction is left, (ii) for a region based on the nose position of the face when the specified face direction is right.

7. An image processing method using an image processing device which includes a processor, the method comprising:
acquiring a face image;
creating a converted face image by performing a first binarization process to the face image using a first threshold value;
specifying a face direction from a visual line direction of eyes in the acquired face image;
detecting a nose ridge in an area determined based on the specified face direction by performing a second binarization process using a second threshold value lower than the first threshold value, when the specified face direction is one of a left side direction and a right side direction; and
adding the detected nose ridge to the converted face image.

8. A non-transitory computer-readable recording medium storing a program for processing an image and causing a computer to execute:
acquiring a face image;
creating a converted face image by performing a first binarization process to the face image using a first threshold value;
specifying a face direction from a visual line direction of eyes in the acquired face image;
detecting a nose ridge in an area determined based on the specified face direction by performing a second binarization process using a second threshold value lower than the first threshold value, when the specified face direction is one of a left side direction and a right side detection; and
adding the detected nose ridge to the converted face image.

9. The non-transitory computer-readable recording medium according to claim 8, wherein
specifying a right-left direction of the face where an axis is a straight line connecting a top of a head and a tip of a jaw in the acquired face image.

10. The non-transitory computer-readable recording medium according to claim 8, wherein
creating a portrait image schematically expressing the face by using the converted face image to which the nose ridge is added.

11. The non-transitory computer-readable recording medium according to claim 8, wherein
adding the nose ridge to the face image with a different brightness from that of a periphery of the contour to a point of the face image where the nose ridge is not able to be recognized since the brightness of the contour is the same as that of the periphery of the contour.

12. The non-transitory computer-readable recording medium according to claim 8, wherein
detecting face components except for the nose ridge by the first binarization process using the first threshold and detecting the nose ridge by the second binarization process using the second threshold.

13. The non-transitory computer-readable recording medium according to claim 8, wherein
setting the area determined (i) for a left region based on a nose position of the face when the specified face direction is left, (ii) for a region based on the nose position of the face when the specified face direction is right.

* * * * *